May 29, 1956   J. E. LIGHTWINE   2,747,262
TOOLS FOR COMPRESSING PISTON RINGS
Filed Dec. 3, 1954
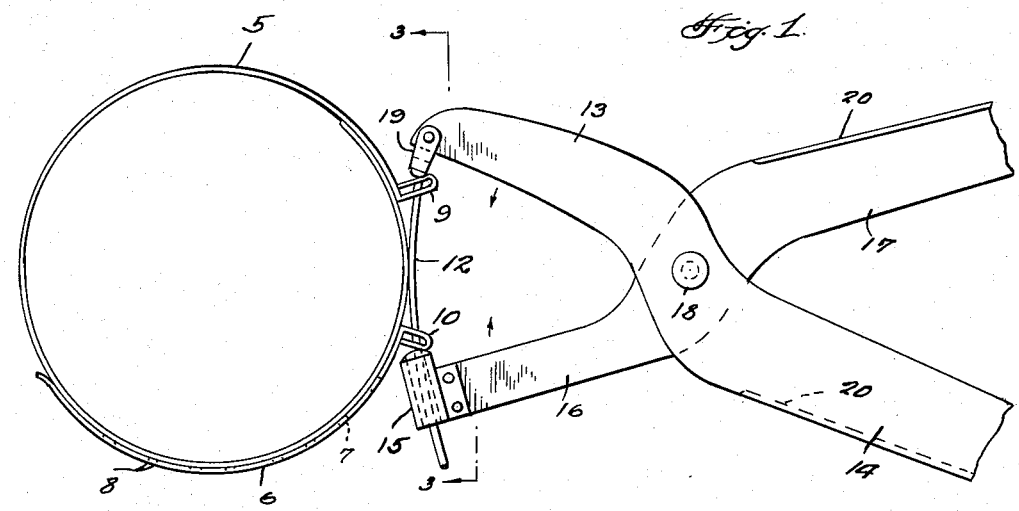
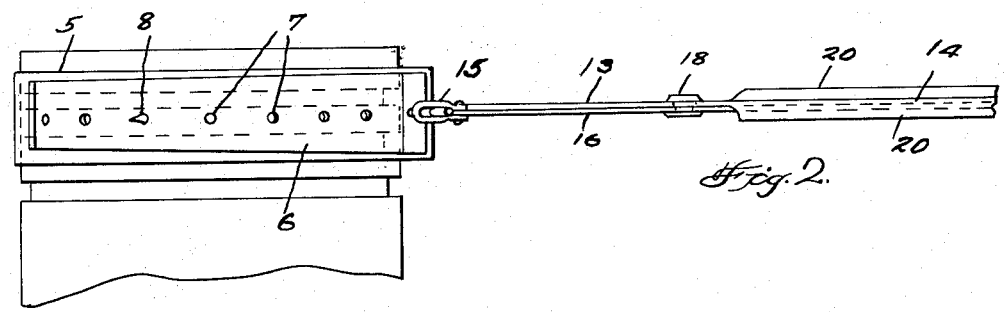
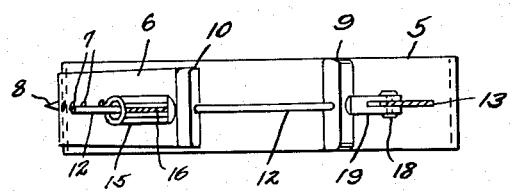
JAMES E. LIGHTWINE INVENTOR
BY *CA Snow & Co.*
ATTORNEYS.

United States Patent Office 2,747,262
Patented May 29, 1956

2,747,262

TOOLS FOR COMPRESSING PISTON RINGS

James E. Lightwine, Arlington, Calif.

Application December 3, 1954, Serial No. 473,018

1 Claim. (Cl. 29—224)

This invention relates to a tool designed for compressing piston rings to facilitate the positioning of piston rings in the ring grooves of pistons.

The primary object of this invention is to provide a piston ring compressor which is so constructed that it may be adjusted for compressing piston rings of various sizes.

An important object of this invention is to provide a piston ring compressor which when moved in compressing a piston ring, will be retained in a true circular formation at all times, eliminating any possibility of distorting the piston ring being compressed.

Another object of the invention is to provide a piston ring compressor in the form of a split band wherein the ends thereof overlap, and a curved band section fitted around said split band in overlapped relation with respect thereto, adjustably connected with the band for varying the diameter of the band.

Still another object of the invention is to provide a guide for guiding the ends of the split band to prevent twisting of the compressor when pressure is brought to bear on the handles of the tool in compressing a ring.

Other and further objects and advantages of the invention will be hereinafter described and the novel features thereof defined in the appended claim.

In the drawings:

Fig. 1 is a plan view of a piston ring compressing tool, constructed in accordance with the invention.

Fig. 2 is a side elevational view thereof.

Fig. 3 is a sectional view taken on the line 3—3 of Fig. 1.

Referring to the drawings in detail, the tool comprises a split band or collar 5 which is constructed of spring steel, the ends of the split band or collar 5 overlapping, as better shown by Fig. 1 of the drawing.

Forming a part of the tool, is a short band section 6 which is also constructed of spring steel, the band section 6 having a line of openings 7 formed therein to receive the lug 8 which is fixed to and extends outwardly from band 5 to permit initial expansion or contraction of band 5 about the piston ring.

Due to this construction, it will be seen that the split band section 6 may be adjusted with respect to the split band or collar 5 to increase or decrease the diameter of the tool, adapting the device for use in compressing piston rings of various sizes.

The ends of the split band or collar 5 and short band section 6 are formed with bearing lug members 9 and 10 respectively, which bearing members extend transversely of the short band or collar and split band sections. These bearing members 9 and 10 are formed with openings through which the curved rod 12 operates. This curved rod 12 is connected with a jaw 13 formed at one end of the handle 14, while the other end of the curved rod 12 passes through an elongated bore formed in a bearing 15 formed at the end of a jaw 16 formed at one end of the handle 17. The handles 14 and 17 are pivotally connected at the point of crossing, as by a pivot pin 18 to the end that by gripping the handles 14 and 17 and forcing them towards each other, the jaws 13 and 16 are moved toward each other, resulting in the contraction of the split band or collar 5 about the piston ring.

It might be further stated that one end of the rod 12 is connected with the jaw 13, through the medium of the pivoted yoke 19, whereby pivotal movement of the rod 12 is permitted with respect to the jaw 13 when actuating the tool.

From the foregoing it will be seen that due to the construction shown and described, I have provided a tool wherein a piston ring may be held and compressed so that it may be easily positioned within the grooves of a piston.

It will further be seen that it is an easy matter to merely move the lug 8 from an opening in the short band section 6 and position it in another opening to adjust the diameter of the tool and vary the range of operation of the tool to meet various requirements.

The handles 14 and 17 have one of their longitudinal edges turned laterally as at 20, providing a stop for the handles to limit the movement of the handles under pressure directed thereto.

Having thus described the invention what is claimed is:

In a tool for compressing piston rings, a body comprising a split band having overlapped ends, a laterally extended bearing having an opening, secured to one end of said split band, a curved metal band strip adjustably connected to said split band, a bearing having an opening extending laterally from the other end of said metal strip, a pair of crossed handles pivotally connected together and providing a pair of jaws, and a guide rod connected to one of said jaws, said rod slidably engaging through said openings in said bearings and slidable through the other of said jaws whereby said jaws engage said bearings moving the split band and strip to thereby effect contracting said band and compressing a piston ring held in said band as said handles are pressed together.

References Cited in the file of this patent

UNITED STATES PATENTS

| | | |
|---|---|---|
| 998,939 | Worden | July 25, 1911 |
| 1,422,557 | Garbeth | July 11, 1922 |
| 1,654,110 | Brown | Dec. 27, 1927 |
| 1,805,543 | Glantz | May 19, 1931 |
| 1,891,560 | Lawrence | Dec. 20, 1932 |